US012732747B2

(12) United States Patent
Yang et al.

(10) Patent No.: US 12,732,747 B2
(45) Date of Patent: Sep. 8, 2026

(54) AUDIO PLAY OPTIMIZATION METHOD, DEVICE AND READABLE STORAGE MEDIUM

(71) Applicant: GOERTEK TECHNOLOGY CO., LTD., Shandong (CN)

(72) Inventors: Huaze Yang, Shandong (CN); Jiangtao Zhao, Shandong (CN); Wensong Zhang, Shandong (CN); Chengtao Miao, Shandong (CN)

(73) Assignee: Goertek Technology Co., Ltd., Qingdao (CN)

( * ) Notice: Subject to any disclaimer, the term of this patent is extended or adjusted under 35 U.S.C. 154(b) by 188 days.

(21) Appl. No.: 18/696,198

(22) PCT Filed: Nov. 24, 2021

(86) PCT No.: PCT/CN2021/132605
§ 371 (c)(1),
(2) Date: Mar. 27, 2024

(87) PCT Pub. No.: WO2023/045059
PCT Pub. Date: Mar. 30, 2023

(65) Prior Publication Data

US 2025/0048026 A1 Feb. 6, 2025

(30) Foreign Application Priority Data

Sep. 27, 2021 (CN) .......................... 202111137389.0

(51) Int. Cl.
*H04R 1/40* (2006.01)

(52) U.S. Cl.
CPC ....... *H04R 1/406* (2013.01); *H04R 2201/403* (2013.01); *H04R 2430/20* (2013.01)

(58) Field of Classification Search
CPC .............. H04R 1/406; H04R 2201/403; H04R 2430/20
USPC ....................................... 381/56, 58, 91, 111
See application file for complete search history.

(56) References Cited

U.S. PATENT DOCUMENTS

| | | | | |
|---|---|---|---|---|
| 2016/0148057 | A1* | 5/2016 | Oh | G06V 10/803 348/143 |
| 2017/0303052 | A1* | 10/2017 | Kakareka | G01S 3/86 |
| 2022/0014868 | A1* | 1/2022 | Binn | H04R 3/12 |

FOREIGN PATENT DOCUMENTS

| | | | | |
|---|---|---|---|---|
| CN | 101656908 A | | 2/2010 | |
| CN | 109698984 A | | 4/2019 | |
| CN | 112188368 A | * | 1/2021 | H04R 9/06 |

* cited by examiner

*Primary Examiner* — William A Jerez Lora
(74) *Attorney, Agent, or Firm* — Baker Botts, L.L.P.

(57) ABSTRACT

The present disclosure provides an audio play optimization method, an electronic device and a readable storage medium. The audio play optimization method comprises: acquiring first position information of a microphone array and an audio signal obtained by means of the microphone array, and determining a sound source position according to the first position information and the audio signal; determining a sound superimposition area of the speaker array; calculating a rotation angle of the speaker array according to an offset angle between the sound source position and the sound superimposition area; rotating the speaker array by the rotation angle, and playing a to-be-played preset audio to the audio source by means of the speaker array after rotating.

10 Claims, 4 Drawing Sheets

AUDIO PLAY OPTIMIZATION METHOD, DEVICE AND READABLE STORAGE MEDIUM

CROSS-REFERENCE TO RELATED APPLICATIONS

The present disclosure is a National Stage of International Application No. PCT/CN2021/132605, filed on Nov. 24, 2021, which claims priority to a Chinese patent application No. 202111137389.0 filed with the CNIPA on Sep. 27, 2021 and entitled "AUDIO PLAY OPTIMIZATION METHOD, DEVICE AND READABLE STORAGE MEDIUM", both of which are hereby incorporated by reference in their entireties.

TECHNICAL FIELD

The present disclosure relates to the field of audio play, and particularly to an audio play optimization method, a device and a readable storage medium.

BACKGROUND

With the continuous development of science and technology, the demand for sound is getting higher and higher. Many audio play products use speaker array to increase the volume. However, in practical applications, the volume of the sound heard by the listener in certain positions is less clear, which leads to a doubling of costs, but the actual effect does not increase but decreases. Further, due to the uncertainty of the listening position of the listener, it is not possible to ensure that the volume and the listening effect are steadily increased, which results in the volume of the audio played using the speaker array not being able to be steadily increased, thereby affecting the audio play effect of the speaker array.

SUMMARY

A main objective of the present disclosure is to provide an audio play optimization method, a device and a readable storage medium intended for solving the technical problem of a poor effect of playing the audio by using the speaker array in the prior art.

To achieve the above objective, the present disclosure provides an audio play optimization method, and the audio play optimization method comprises:

- acquiring first position information of a microphone array and an audio signal obtained by means of the microphone array, and determining a sound source position according to the first position information and the audio signal;
- determining a sound superimposition area of the speaker array;
- calculating a rotation angle of the speaker array according to an offset angle between the sound source position and the sound superimposition area; and
- rotating the speaker array by the rotation angle, and playing a to-be-played preset audio to the audio source by means of the speaker array after completion of the rotation.

Optionally, the microphone array comprises a first microphone and a second microphone, and a step of said "acquiring first position information of a microphone array and an audio signal obtained by means of the microphone array, and determining a sound source position according to the first position information and the audio signal" comprises:

- acquiring a first microphone position and a first audio signal of the first microphone, and a second microphone position and a second audio signal of the second microphone;
- according to the first audio signal and the second audio signal, calculating to obtain a first signal energy of the first audio signal, a second signal energy of the second audio signal, and delay information between the first audio signal and the second audio signal; and
- determining the sound source position according to the first signal energy, the second signal energy, the delay information, the first microphone position and the second microphone position.

Optionally, a step of said "according to the first audio signal and the second audio signal, calculating to obtain delay information between the first audio signal and the second audio signal" comprises:

- converting the first audio signal from time domain to frequency domain so as to obtain first frequency-domain data of the first audio signal, and converting the second audio signal from the time domain to the frequency domain to obtain second frequency-domain data of the second audio signal; and
- calculating to obtain the delay information between the first audio signal and the second audio signal according to a phase difference between the first frequency-domain data and the second frequency-domain data.

Optionally, a step of said "determining the sound source position according to the first signal energy, the second signal energy, the delay information, and microphone positions" comprises:

- determining a first position relationship between the first microphone position, the second microphone position and the sound source position according to the first signal energy and the second signal energy;
- determining a second position relationship between the first microphone position, the second microphone position and the sound source position according to the delay information; and
- determining the sound source position according to the first position relationship and the second position relationship.

Optionally, a step of said "determining a first position relationship between the first microphone position, the second microphone position and the sound source position according to the first signal energy and the second signal energy" comprises:

- calculating a propagation distance ratio of a sound signal according to a signal energy difference between the first signal energy and the second signal energy; and
- determining the first position relationship between the first microphone position, the second microphone position and the sound source position according to the distance ratio.

Optionally, a step of said "determining a second position relationship between the first microphone position, the second microphone position and the sound source position according to the delay information" comprises:

- calculating a distance difference of propagation of the sound signal according to the delay information; and
- determining the second position relationship between the first microphone position, the second microphone position and the sound source position according to the distance difference.

Optionally, the speaker array comprises a first speaker group and a second speaker group which are plane-symmetrical, and a step of said "determining a sound superimposition area of the speaker array" comprises:

acquiring a symmetry plane between the first speaker group and the second speaker group; and taking the symmetry plane as the sound superimposition area of the speaker array.

Optionally, after a step of said "determining a sound source position according to the first position information and the audio signal", further comprising:

when there are determined more than one sound source position, rotating the speaker array by a preset angle, and returning to perform a step of: acquiring the first position information of the microphone array and the audio signal output by the microphone array.

The present disclosure further provides an electronic device, and the electronic device is a physical device and comprises: a memory, a processor and a program of the audio play optimization method which is stored in and can be run in the memory, and the program of the audio play optimization method, when executed by a processor, can implement steps of the audio play optimization method as described above.

The present disclosure further provides a readable storage medium, the readable storage medium stores a program implementing the audio play optimization method, and the program implementing the audio play optimization method, when executed by a processor, implements steps of the audio play optimization method as described above.

The present disclosure further provides a computer program product comprising a computer program, and the computer program, when executed by a processor, implements the steps of the projection font color selection method as described above.

The present disclosure provides an audio play optimization method, a device and a readable storage medium. As compared to the technical means in the prior art of increasing the volume by using a speaker array, the present disclosure locates the sound source by acquiring first position information of a microphone array and an audio signal obtained by means of the microphone array and determining a sound source position according to the first position information and the audio signal: determines an optimal target orientation for receiving a to-be-played preset audio by a speaker by determining a sound superimposition area of a speaker array; and overlaps the sound source position with the sound superimposition area by determining the rotation angle of the speaker array according to the sound source position and the sound superimposition area and rotating the speaker array by the rotation angle. Here it is to be noted that depending on the different positions of the listener, the reason why the volume of playing the audio by using the speaker array may decrease rather than increase is: two or more rows of sound waves may interfere with each other, which leads to a sound superimposition area and a sound cancellation area appearing in the sound field, wherein the sound superimposition area causes the sound waves to be superimposed and increase the volume, while the sound cancellation area causes the sound waves to be cancelled to reduce the volume and the sound quality. In a practical application process, since the specific location of the sound receiver cannot be determined, it cannot be guaranteed that the sound receiver is in the sound superimposition area when receiving the audio. If the sound receiver is in the cancellation area when receiving the audio, the volume of the received audio will not be increased, but will be reduced. Therefore, by determining the position of the listener through the microphones, it is possible to determine the best target orientation for playing the audio according to the position of the listener and the sound superimposition area, and then to play the audio directionally to the listener in the sound superimposition area by rotating the speaker array, such that the volume of playing the audio by the speaker array is steadily improved, therefore overcoming the defect that the volume of the audio may be reduced due to the inability to determine the specific location of the sound receiver, guaranteeing that the sound receiver is in the sound superimposition area when receiving audio, and effectively improving the audio playing effect of speaker array.

BRIEF DESCRIPTION OF THE DRAWINGS

In order to clearly illustrate technical solutions of the embodiments of the present disclosure or those in the prior art, accompanying drawings that need to be used in the embodiments or the prior art will be briefly introduced as follows. Obviously, drawings in following description are only a part of the present disclosure. For those skilled in the art, other drawings can also be obtained according to the disclosed drawings without creative efforts.

DETAILED DESCRIPTION

Technical solutions in the embodiments of the present disclosure are described below with reference to the accompanying drawings in the embodiments of the present disclosure. Obviously, the described embodiments are merely some rather than all of the embodiments of the present disclosure. All other embodiments, acquired by those of ordinary skill in the art based on the embodiments of the present disclosure without any creative work, should fall into the protection scope of the present disclosure.

First Embodiment

Figure 1:
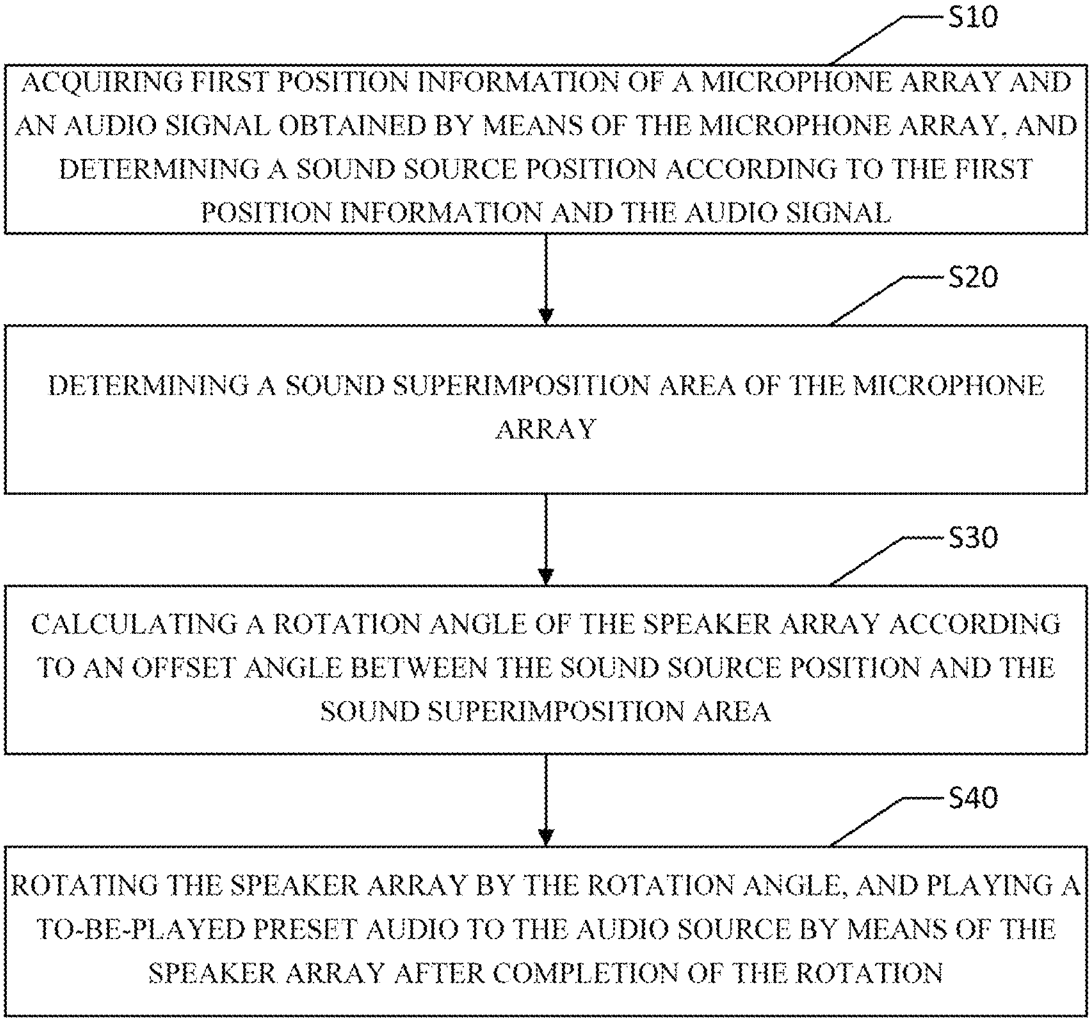
FIG. 1 shows a flow diagram of a first embodiment of audio play optimization of the present disclosure.

An embodiment of the present disclosure provides an audio play optimization method. In a first embodiment of the audio play optimization method of the present disclosure, as shown in FIG. 1, the audio play optimization method comprises:

Step S10, acquiring first position information of a microphone array and an audio signal obtained by means of the microphone array, and determining a sound source position according to the first position information and the audio signal:

In the present embodiment, it should be noted that the microphone array is composed of a certain number of acoustic sensors (generally microphones), and is a system for sampling and processing sound signals. Since each microphone in the microphone array is located at a different distance from the sound source and the surrounding environment in space, the received audio signals will be different, for example, if the microphone array is composed of N microphones, N audio signals output from the microphone array may be acquired.

Specifically, establishing a coordinate system, acquiring first position information of each microphone in the microphone array in the coordinate system, converting the received sound signals from the same audio source into audio signals through each microphone in the microphone array, further performing processing (such as gain, denoising, channel combination, characteristic audio signal screening, and the like) and calculating (such as Fourier transform, function operation, integral operation, four arithmetic operations, and the like) on the audio signals to obtain signal energy, frequency-domain data and/or time-domain data of the audio signals, and the like, then calculating to obtain signal energy difference, phase difference, delay information and the like of audio signals received by different microphones, and then according to relationship of the difference in the energy attenuation during propagation, the difference in the propagation time during propagation, differences in paths of reflections occurring at the interfaces of different media in space, and the like of the sound signal received from the same sound source by the microphones at different positions, and differences between the position coordinates of different microphones, it is possible to determine the functional relationship between the coordinates of a plurality of sound source positions and the coordinates of the microphone positions, and then solve the functional relationship to obtain the coordinates of the sound source positions, wherein the first position information comprises a coordinate of a microphone position of each microphone, a distance between the microphones, and the like, and the delay information refers to a time difference between homologous signals received by different microphones in the array due to different transmission distances of the signals.

Preferably, after a step of said "determining a sound source position according to the first position information and the audio signal", further comprising:

- when there are determined more than one sound source position, rotating the speaker array by a preset angle, and returning to perform a step of: acquiring the first position information of the microphone array and the audio signal output by the microphone array.

In the present embodiment, specifically, when the number of the coordinates of the sound source positions determined according to the first position information and the audio signal is more than two or innumerable (for example, a function relation is obtained after solving), rotating the microphone array by a preset angle, and returning to execute the step of: acquiring the first position information of the microphone array and the audio signal output by the microphone array, wherein when the sound signal being interfered by noise or environment, obstacles on the sound propagation path, and errors occurred during the processing of the audio signal and/or the source being in a particular position leads to special cases such as obtaining special solutions during the calculation, all may lead to the computation of results that are not unique but have multiple solutions or solutions to a functional relationship, and thus it is not possible to determine exactly which sound source position is the correct sound source position. At this point, it is possible to rotate the microphone array by one preset angle so as to avoid interference by changing the position of the received sound, and return to execute the step: acquiring the first position information of the microphone array and the audio signal output by the microphone array to re-determine the sound source position.

In one implementation, when there are determined more than one sound source position, taking the sound source position as a first reference sound source position, and rotating the microphone array by a preset angle, and returning to execute the step: acquiring the first position information of the microphone array and the audio signal output by the microphone array to re-determine a new sound source position: taking the new sound source position as a second reference sound source position; and determining the sound source position by combining the first reference sound source position and the second reference sound source position.

In the present embodiment, a solution to special situations in the process of solving sound source position is proposed. By rotating the microphone array to change the position of the received sound signal, the sound propagation path may be changed, and then all parameters of the whole calculation process may be changed, which effectively prevents errors in any of the parameters from causing problems in the calculation result. Further, the change of the sound propagation path may also change the influence of external obstacles or noise on the sound propagation in the process of sound propagation, and by taking the sound source positions calculated twice as the reference sound source positions, the reference sound source positions obtained by combining the two calculations may more accurately determine the final determined sound source position, which effectively improves the accuracy and success rate of determining the sound source position.

Step S20, determining a sound superimposition area of the microphone array:

In the present embodiment, it should be noted that two columns of sound waves with the same frequency are superimposed, so that the vibration in some areas is enhanced and the vibration in some areas is weakened, and the area where the vibration is enhanced is the superimposition area of the sound waves and the area where the vibration is weakened is the cancellation area of the sound waves, wherein the symmetrical plane of any two sound sources is the area with the largest volume superposition in the superposition area, so taking the area as the sound superimposition area may ensure the effect and stability of sound superposition.

In the present embodiment, specifically, acquiring a symmetrical plane of each two speakers in the speaker array, further obtaining an intersection of the symmetrical planes, and taking the intersection as the sound superimposition area; wherein when the intersection is more than one, acquiring superposition times of the intersection, and taking a target intersection with the most superposition times in the intersections as the final sound superimposition area; wherein when the intersection is more than one, taking a target intersection nearest to the sound source position in the intersection as the sound superimposition area.

Preferably, the speaker array comprises a first speaker group and a second speaker group which are plane-symmetrical, In the present embodiment, it should be noted that the first speaker group comprises at least one speaker, the second speaker group also comprises at least one speaker, and any speaker in the first speaker group is plane symmetric with the only speaker in the second speaker group.

The step of acquiring the sound superimposition area of the speaker array comprises:

Step A10, acquiring a symmetry plane between the first speaker group and the second speaker group:

Step A20, taking the symmetry plane as the sound superimposition area of the microphone array.

In the present embodiment, specifically, acquiring a symmetry plane which enables all speakers in the first speaker group and all speakers in the second speaker group to be symmetrical one by one, and taking the symmetry plane as the sound superimposition area of the microphone array.

Step S30, calculating a rotation angle of the speaker array according to an offset angle between the sound source position and the sound superimposition area:

In the present embodiment, specifically, according to the coordinate of the sound source position, the position of the rotating base point and the position of the sound superimposition area, performing calculation by combining a trigonometric function to obtain an offset angle between the sound source position and the sound superimposition area, and then according to the offset angle, performing calculation by combining the trigonometric function to obtain a rotation angle of the speaker array based on the rotation base point; wherein the speaker array rotates about the rotation base point, which may be a point or an axis: if the rotation base point is the point, the speaker array may be rotated around the point within a full angle in three-dimensional space, or may be rotated at any preset angle (for example, rotation within 180 degrees in the horizontal direction and within 180 degrees in the vertical direction: rotation within 360 degrees in the horizontal direction and within 270 degrees in the vertical direction) within the full angle due to different actual needs or hardware limitations (for example, limitations on a fixed position and a fixed mode of the speaker array, calculation and solving requirements, etc.); if the rotation base point is the axis, the speaker array may be rotated 360 degrees about the axis in a plane perpendicular to the axis, or may be rotated at any preset angle within 360 degrees due to different actual needs or hardware limitations (for example, limitations on a fixed position and a fixed mode of the speaker array, calculation and solving requirements, etc.).

Figure 2:
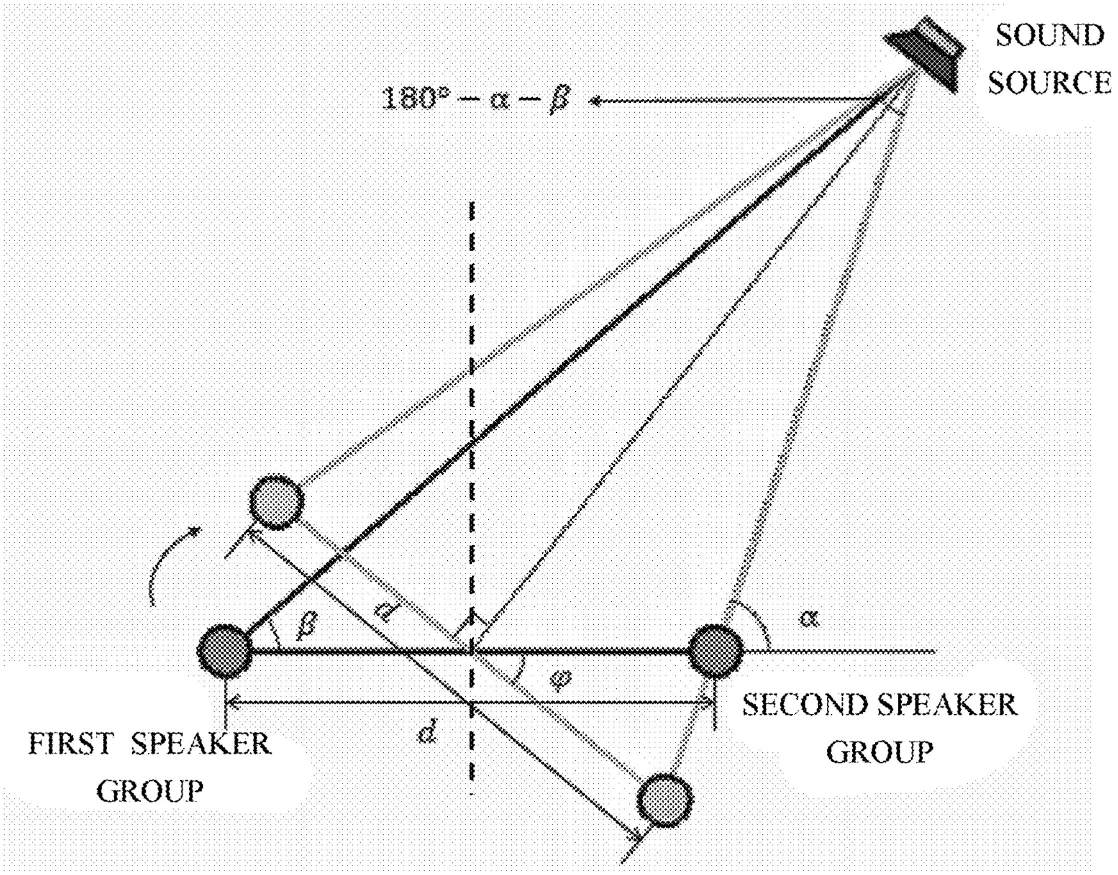
FIG. 2 is a schematic top view of a rotation angle of audio play optimization in an embodiment of the present disclosure.

In one implementation, the rotation base point is the rotation axis, and the speaker array comprises a speaker group 1 and a speaker group 2. The speaker group 1 comprises at least one speaker, and the speaker group 2 also comprises at least one speaker. Any one of the speakers in the speaker group 1 is symmetrical to the only one of the speakers in the speaker group 2 along the rotation axis, wherein the speaker array can be rotated by any angle in the horizontal direction around the rotation axis. Referring to FIG. 2, FIG. 2 is a schematic top view of the rotation angle in the present embodiment, and it can be seen by calculating that the offset angle is equal to rotation angle $\varphi=180°-\alpha-\beta$, wherein given the coordinate of the sound source position, the angles of $\alpha$ and $\beta$ may be calculated by the trigonometric function.

Step S40, rotating the speaker array by the rotation angle, and playing a to-be-played preset audio to the audio source through the speaker array after completion of the rotation.

In the present embodiment, specifically, rotating the speaker array by the rotation angle such that the sound source position is in the sound superimposition area, and playing the to-be-played preset audio to the audio source through the speaker array after completion of the rotation.

In the present embodiment, by acquiring first position information of a microphone array and an audio signal obtained by means of the microphone array, and determining a sound source position according to the first position information and the audio signal, the present disclosure locates the sound source by acquiring first position information of a microphone array and an audio signal obtained by means of the microphone array and determining a sound source position according to the first position information and the audio signal, determines an optimal target orientation for receiving a to-be-played preset audio by a speaker by determining a sound superimposition area of a speaker array, and overlaps the sound source position with the sound superimposition area by determining the rotation angle of the speaker array according to the sound source position and the sound superimposition area and rotating the speaker array by the rotation angle, wherein it should be noted that the reason why the volume of playing the audio by using the speaker array may not increase but decrease depending on the position of the listener is that two or more rows of sound waves may interfere with each other, which leads to a sound superimposition area and a sound cancellation area appearing in the sound field, wherein the sound superimposition area causes the sound waves to be superimposed and increase the volume, while the sound cancellation area causes the sound waves to be cancelled to reduce the volume and the sound quality. In the actual use process, since the specific location of the sound receiver cannot be determined, it cannot be guaranteed that the sound receiver is in the sound superimposition area when receiving the audio. If the sound receiver is in the cancellation area when receiving the audio, the volume of the received audio will not be increased, but will be reduced. Therefore, by determining the position of the listener through the microphones, it is possible to determine the best target orientation for playing the audio according to the position of the listener and the sound superimposition area, and then to play the audio directionally to the listener in the sound superimposition area by rotating the speaker array, such that the volume of playing the audio by the speaker array is steadily improved, therefore overcoming the defect that the volume of the audio may be reduced due to the inability to determine the specific location of the sound receiver, guaranteeing that the sound receiver is in the sound superimposition area when receiving audio, and effectively improving the audio playing effect of speaker array.

Second Embodiment

Figure 3:
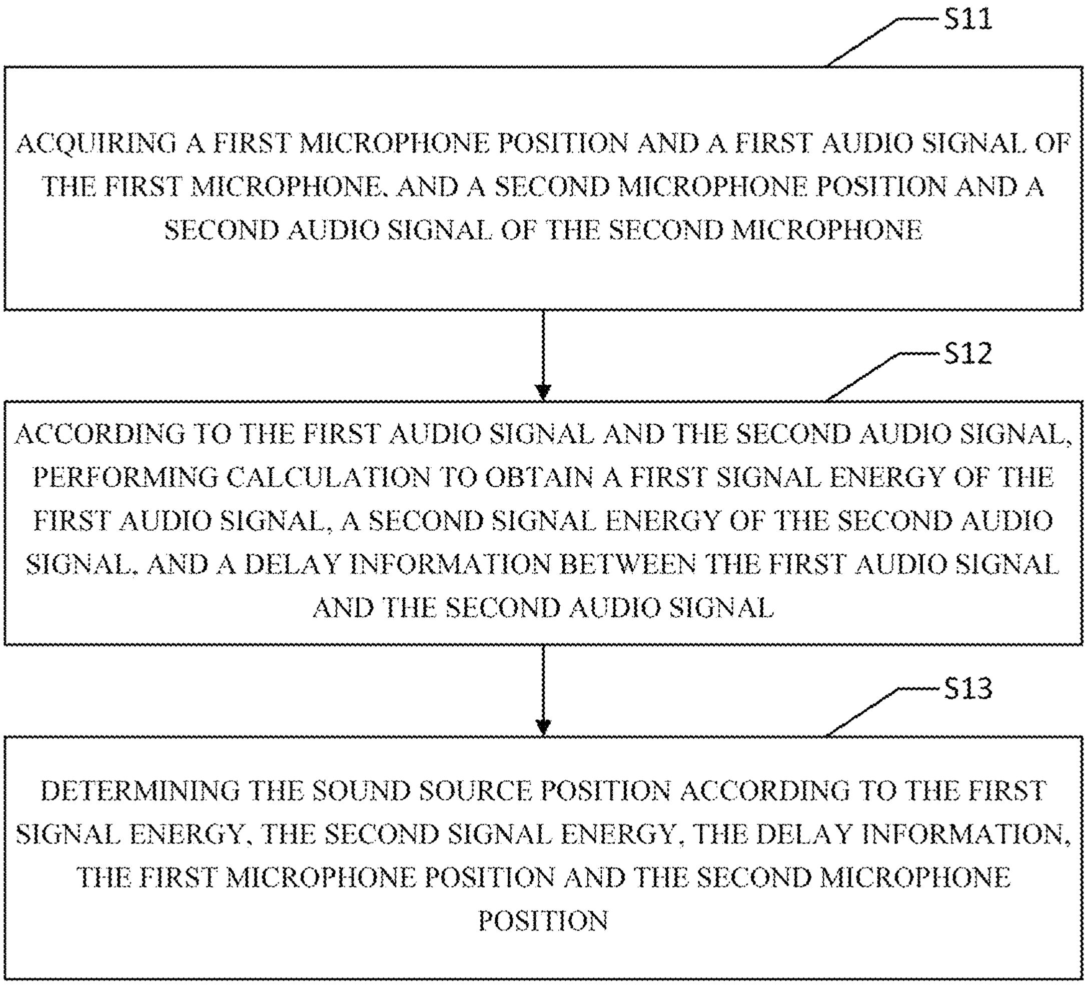
FIG. 3 shows a flow diagram of a second embodiment of audio play optimization of the present disclosure.
Figure 4:
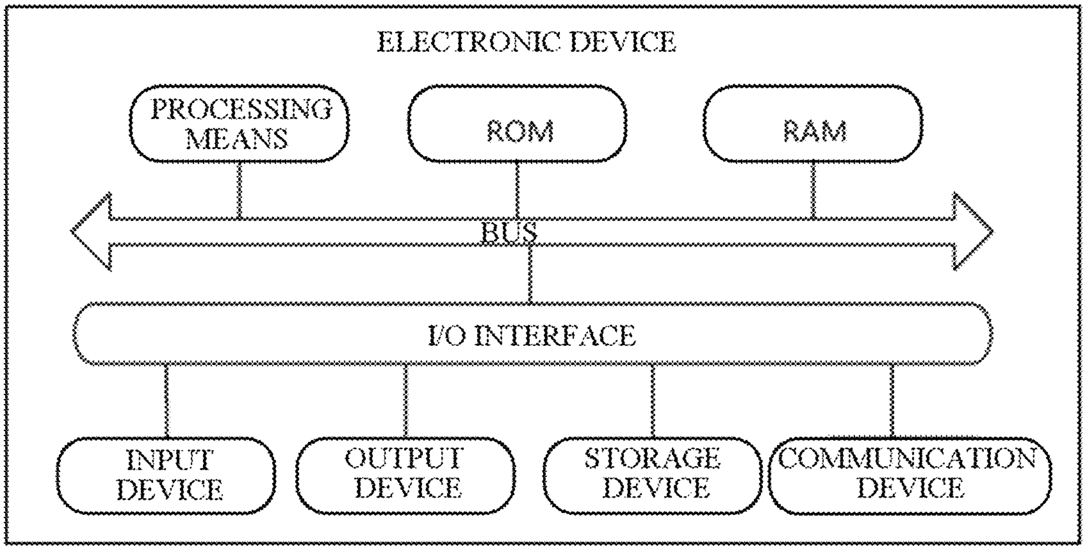
FIG. 4 is a schematic structural illustration of a device of a hardware operating environment involved in audio play optimization in an embodiment of the present disclosure.

Further, referring to FIG. 3, based on present embodiment, in the present embodiment, the same or similar contents as the first embodiment above can be referred to the introduction above and will not be elaborated below. On this basis, the microphone array comprises a first microphone and a second microphone, and a step of said "acquiring first position information of a microphone array and an audio signal obtained by means of the microphone array, and determining a sound source position according to the first position information and the audio signal" comprises:

Step S11, acquiring a first microphone position and a first audio signal of the first microphone, and a second microphone position and a second audio signal of the second microphone:

In the present embodiment, specifically, establishing a two-dimensional coordinate system, acquiring information of a first microphone position of a first microphone in the two-dimensional coordinate system and a first audio signal output by the first microphone after the first microphone converts a received sound signal into an electric signal, and acquiring information of a second microphone position of the second microphone in the coordinate system and a second audio signal output by the second microphone after the second microphone converts a received sound signal into an electric signal.

Step S12, according to the first audio signal and the second audio signal, performing calculation to obtain a first signal energy of the first audio signal, a second signal energy of the second audio signal, and a delay information between the first audio signal and the second audio signal:

In the present embodiment, it should be noted that the signal energy received by each microphone over a period of time is the sum of squares of the signal sampled by the microphone during this period.

Specifically, obtaining the first signal energy by integrating the first audio signal, obtaining the second signal energy by integrating the second audio signal, and then based on the time-domain data and frequency-domain data of the first audio signal and the second audio signal, etc., performing calculation to obtain a phase difference between the first audio signal and the second audio signal, so as to the delay information between the first audio signal and the second audio signal, wherein the delay information may be calculated according to a cross-correlation function, an impulse response (or a transfer function) of a path, a pitch-weighted time delay estimation method combined with speech characteristics, a time delay estimation method based on ear perception characteristics, and other methods.

Preferably, the step of said "according to the first audio signal and the second audio signal, calculating to obtain delay information between the first audio signal and the second audio signal" comprises:

Step S121, converting the first audio signal from time domain to frequency domain so as to obtain first frequency-domain data of the first audio signal, and converting the second audio signal from the time domain to the frequency domain to obtain second frequency-domain data of the second audio signal:

In the present embodiment, specifically, the first audio signal obtained by sampling the sound signal by the first microphone and the audio signal obtained by sampling the sound signal by the second microphone are both time-domain signals that change with time, and by converting the first audio signal and the second audio signal from time-domain signals to frequency-domain signals by means of Fourier transformation, the first frequency-domain data corresponding to the first audio signal and second frequency-domain data corresponding to the second audio signal are obtained.

Step S122, performing calculation to obtain the delay information between the first audio signal and the second audio signal based on the first frequency-domain data and the second frequency-domain data.

In the present embodiment, specifically, obtaining complex data in form of a +bi of the first frequency-domain data and the second frequency-domain data corresponding to the time-domain data respectively, performing a solution to obtain a real part and an imaginary part of the complex data by using "imreal" and "imahinary" functions, and performing calculation according to the real part and the imaginary part to obtain a corresponding phase, and further performing calculation to obtain the phase difference between the first audio signal and the second audio signal so as to obtain the delay information between the first audio signal and the second audio signal.

In the present embodiment, the delay information is obtained by performing the calculation to obtain the phase difference between the audio signals without adding a hardware device or obtaining other information, which may obtain delay information at low cost and quickly, improve the efficiency of locating the sound source, and further improve the efficiency of audio play optimization.

Step S13, determining the sound source position according to the first signal energy, the second signal energy, the delay information, the first microphone position and the second microphone position.

In the present embodiment, specifically, according to the difference of the attenuation during propagation of the energy of the sound signals which are received by the microphones at different positions and emitted by the same sound source, it is possible to obtain a functional relationship between the first microphone position, the second microphone position, the first signal energy, the second signal energy, and the sound source position: according to the difference of receiving time caused by different propagation distances of the sound signals which are received by the microphones at different positions and emitted by the same sound source, it is possible to determine a functional relationship between the first microphone position, the second microphone position, the delay information, and the sound source position: in the function relationship determined based on the energy and the function relationship determined based on the delay information, only the sound source position is an unknown number, so that the position coordinate of the sound source may be determined.

Preferably, the step of determining the sound source position according to the first signal energy; the second signal energy, the delay information, and the microphone positions comprises:

Step S131, determining a first position relationship between the first microphone position, the second microphone position and the sound source position according to the first signal energy and the second signal energy:

In the present embodiment, specifically, based on the fact that the attenuation of signal energy obeys the inverse square law during the propagation of sound, by determining the relationship between the signal sample, the source signal, and the propagation distance of the sound signal of the sound source while it is known that the signal energy received by each microphone over a period of time is the sum of the squares of the signal samples of that microphone over that period of time, it is possible to obtain two relations between the signal energy of the two microphones, the source signal and the propagation distance of the sound signal, and the propagation distance of the sound signal is represented by the first microphone position, the second microphone position and the sound source position. Since the source signals of the homologous signals are the same, after performing the calculation to cancel out the source signals, it is possible to obtain a relationship between the first signal energy, the second signal energy, the first microphone position, the second microphone position, and the sound source position; since the first signal energy and the second signal energy may be obtained by integrating them by sampling the signals, it is possible to obtain the first positional relationship between the first microphone position, the second microphone position, and the sound source position.

Preferably, the step of determining the first positional relationship between the first microphone position, the second microphone position, and the sound source position according to the first signal energy and the second signal energy, comprises:

Step S1311, calculating a propagation distance ratio of a sound signal according to a signal energy difference between the first signal energy and the second signal energy:

In the present embodiment, specifically, by calculating the signal energy difference between the first signal energy and the second signal energy, the source signal may be canceled from the formula, and since the signal energy is equal to the sum of squares of the signal samples, the signal samples are inversely proportional to the propagation distance of the sound signal. It can be seen that the signal energy is inversely proportional to the square of the propagation distance of the sound signal, and then it can be concluded that the ratio of the first signal energy to the second signal energy is equal to the ratio of the propagation distance of the sound signal from the sound source to the second microphone to the propagation distance of the sound signal from the sound source to the first microphone.

Step S1312, determining the first position relationship between the first microphone position, the second microphone position and the sound source position according to the distance ratio.

In the present embodiment, specifically, the propagation distance of the sound signal is represented by the first microphone position, the second microphone position and the sound source position, the first signal energy and the second signal energy can be obtain by integrating the signal sample, and therefore the first position relationship between the first microphone position, the second microphone position and the sound source position may be obtained.

Step S132, determining a second position relationship between the first microphone position, the second microphone position and the sound source position according to the delay information:

In the present embodiment, specifically, by determining the difference in the propagation distance of the sound signals according to the delay information and expressing the propagation distance of the sound signal by the first microphone position, the second microphone position and the sound source position, then the second position relationship between the first microphone position, the second microphone position and the sound source position may be obtained: the delay information may be calculated according to a cross-correlation function, an impulse response (or a transfer function) of a path, a pitch-weighted time delay estimation method combined with speech characteristics, a time delay estimation method based on ear perception characteristics, and other methods.

Preferably, the step of determining the second position relationship between the first microphone position, the second microphone position and the sound source position according to the delay information, comprises:

Step S1321, calculating a distance difference of propagation of the sound signal according to the delay information:

In the present embodiment, specifically, obtaining the delay information according to the difference in arrival times between the audio signals arriving at the two microphones. In addition, according to the delay information and the propagation speed of the sound in the medium, performing the calculation to obtain a distance difference between the distance of the audio signal propagating from the sound source position to the first microphone position and the distance of the audio signal propagating from the sound source position to the second microphone position.

Step S1322, determining the second position relationship between the first microphone position, the second microphone position and the sound source position according to the distance difference.

In the present embodiment, specifically, the first microphone position and the sound source position represent a first propagation distance of the sound signal from the sound source to the first microphone, the second microphone position and the sound source position represent a second propagation distance of the sound signal from the sound source to the second microphone, and according to a distance difference between the first propagation distance and the second propagation distance, the second position relationship between the first microphone position, the second microphone position and the sound source position may be obtained.

Step S133, determining the sound source position according to the first position relationship and the second position relationship.

In the present embodiment, specifically, in the first position relationship and the second position relationship, the unknowns are only the abscissa and the ordinate of the sound source position, and the abscissa and the ordinate of the sound source position may be obtained by solving the equation set consisting of the first position relationship and the second position relationship, and thus the sound source position may be determined.

In the present embodiment, it is possible to accurately locate the sound source through two microphones, reduce the number of microphones required for locating the sound source, effectively reduce the cost of locating the sound source, and also reduce the hardware size of the device.

Third Embodiment

An embodiment of the present disclosure provides an electronic device, comprising: at least one processor; and, a memory communicatively coupled to the at least one processor; wherein the memory stores instructions executable by the at least one processor, and the instructions, when executed by the at least one processor, enable the at least one processor to execute the audio play optimization method of one of embodiments as described above.

Reference is made below to FIG. 5, which shows a structural schematic diagram of an electronic device suitable for implementing an embodiment of the present disclosure. The electronic device in the embodiment of the present disclosure may include, but is not limited to, a mobile terminal such as a mobile phone, a notebook computer, a digital broadcast receiver, a PDA (Personal Digital Assistant), a PAD (Tablet PC), a PMP (Portable Multimedia Player), a vehicle-mounted terminal (e.g., a vehicle-mounted navigation terminal), etc., as well as a mobile terminal such as a digital TV, a desktop computer, Intelligent security products and other fixed terminals. The electronic device shown in FIG. 5 is only an example, and should not introduce any limitation to the functionality and scope of use of the embodiments of the present disclosure.

As shown in FIG. 5, the electronic device may comprise a processing means (such as a central processing unit, a graphic processing unit, or the like), which may perform a variety of appropriate actions and processing depending on the program stored in the read-only memory (ROM) or loaded from the storage means into the random access memory (RAM). In RAM, various programs and data required for the operation of electronic equipment are also stored. The processing means, ROM and RAM are connected to each other through the bus. The input/output (I/O) interface is also connected to the bus.

In general, the following systems may be connected to the I/O interface: input devices including, e.g., a touch screen, a touch pad, a keyboard, a mouse, an image sensor, a microphone, an accelerometer, a gyroscope, etc.: output devices including, e.g., a liquid crystal display (LCD), a speaker, a vibrator, etc.: storage devices including, e.g., a tape, a hard disk, etc.; and communication devices. The communication means may allow the electronic device to communicate wirelessly or by wire with other devices to exchange data. While electronic devices with various systems are shown in the drawings, it should be understood that not all of the illustrated systems are required to be implemented or provided. More or fewer systems may alternatively be implemented or provided.

In particular, according to the embodiment of the present disclosure, the process described above with reference to the flowchart may be implemented as a computer software program. For example, an embodiment of the present disclosure includes a computer program product comprising a computer program carried on a computer readable medium, the computer program containing program code for executing the method illustrated in the flowchart. In such an embodiment, the computer program may be downloaded and installed from a network through a communication device, or installed from a storage device, or installed from a ROM. When the computer program is executed by the processing means, the above-described functions defined in the method of the embodiment of the present disclosure are performed.

The electronic device provided in the present disclosure adopts the audio play optimization method in the first embodiment or the second embodiment, which solves the technical problem of a poor effect of playing the audio by using the speaker array. Compared to the prior art, the beneficial effects of the electronic device provided by the embodiment of the present disclosure are the same as the beneficial effects of the audio play optimization method provided by the first embodiment, and other technical features in the electronic device are the same as the features disclosed by the method of the preceding embodiment, which are not repeated herein.

It is to be understood that portions of the present disclosure may be implemented in hardware, software, firmware, or a combination thereof. In the description of the above embodiments, the particular features, structures, materials, or characteristics may be combined in any suitable manner in any one or more embodiments or examples.

The foregoing is only a specific embodiment of the present disclosure, but the protection scope of the present disclosure is not limited thereto, and any variation or substitution that can be readily thought of by any person skilled in the art within the technical scope disclosed in the present disclosure shall be covered within the protection scope of the present disclosure.

Fourth Embodiment

The present embodiment provides a computer-readable storage medium having computer-readable program instructions stored thereon for executing the audio play optimization method in the first embodiment described above.

The computer readable storage media provided in embodiments of the present disclosure can be, for example, a U disk, but not limited to electrical, magnetic, optical, electromagnetic, infrared, or a semiconductor system, system or device, or a combination of any of the above. More specific examples of the computer readable storage medium may comprise but are not limited to: an electrical connection with one or more conductors, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, and any suitable combination of the foregoing. In the present embodiments, a computer readable storage medium may be any tangible medium that can contain, or store a program for use by or in connection with an instruction execution system, system, or device. The program code contained on the computer-readable storage medium may be transmitted using any suitable medium, including, but not limited to: electric wires, optical cables, RF (Radio Frequency), etc., or any suitable combination of the above.

The computer readable storage medium may be comprised in the electronic device, or may be present alone without being assembled into the electronic device.

The above computer readable storage medium carries one or more programs, and when one or more of the above programs are executed by an electronic device, enabling the electronic device: obtaining at least two Internet Protocol addresses: sending a node evaluation request comprising at least two Internet Protocol addresses to the node evaluation device, wherein the node evaluation device selects an Internet Protocol address from at least two Internet Protocol addresses and returns: receiving an Internet Protocol address returned by the node evaluation device; wherein the obtained Internet Protocol address indicates an edge node in the content delivery network.

Alternatively, the above computer readable storage medium carries one or more programs, and when one or more of the above programs are executed by an electronic device, enabling the electronic device: receiving node evaluation requests including at least two Internet protocol addresses: selecting the Internet protocol address from the at least two Internet protocol addresses: returning the selected Internet protocol address: wherein, the received Internet protocol address indicates the edge node in the content distribution network.

Computer program code for performing the operations of the present disclosure may be written in one or more programming languages or combinations thereof. The programming languages comprise an object-oriented programming language such as Java, Smalltalk, C++ or the like, and further comprise conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules involved in the embodiments of the present disclosure may be realized by way of software or may be realized by way of hardware. Wherein, the name of the module does not constitute a limitation of the unit itself in a particular case.

The computer readable storage medium provided by the present disclosure stores computer readable program instructions for executing the audio play optimization method described above, which solves the technical problem of a poor effect of playing the audio by using the speaker array. Compared to the prior art, the beneficial effects of the computer readable storage medium provided by the embodiment of the present disclosure are the same as the beneficial effects of the audio play optimization method provided by the first embodiment or the second embodiment, which are not repeated herein.

Fifth Embodiment

The present disclosure also provides a computer program product comprising a computer program that, when executed by a processor, implements the steps of the audio play optimization method as described above.

The computer program product provided by the present disclosure solves the technical problem of a poor effect of playing the audio by using the speaker array. Compared to the prior art, the beneficial effects of the computer program product provided by the embodiment of the present disclosure are the same as the beneficial effects of the audio play optimization method provided by the first embodiment or the second embodiment, which are not repeated herein.

The foregoing is only a preferred embodiment of the present disclosure, and is not intended to limit the patent scope of the present disclosure. Any equivalent structure or equivalent process transformation made by using the contents of the specification and the drawings of the present disclosure, or directly or indirectly applied to other related technical fields, are included in the patent scope of the present disclosure.

The invention claimed is:

1. An audio play optimization method, comprising:

acquiring first position information of a microphone array and an audio signal obtained by the microphone array, and determining a sound source position according to the first position information and the audio signal;

determining a sound superimposition area of a speaker array;

calculating a rotation angle of the speaker array according to an offset angle between the sound source position and the sound superimposition area; and rotating the speaker array by the rotation angle, and playing a to-be-played preset audio to the audio source by the speaker array after rotating.

2. The audio play optimization method according to claim 1, wherein the microphone array comprises a first microphone and a second microphone, and said acquiring first position information of a microphone array and an audio signal obtained by the microphone array, and determining a sound source position according to the first position information and the audio signal, comprises:

acquiring a first microphone position and a first audio signal of the first microphone, and a second microphone position and a second audio signal of the second microphone;

according to the first audio signal and the second audio signal, calculating to obtain a first signal energy of the first audio signal, a second signal energy of the second audio signal, and delay information between the first audio signal and the second audio signal; and determining the sound source position according to the first signal energy, the second signal energy, the delay information, the first microphone position, and the second microphone position.

3. The audio play optimization method according to claim 2, wherein said "according to the first audio signal and the second audio signal, calculating to obtain delay information between the first audio signal and the second audio signal", comprises:

converting the first audio signal from time domain to frequency domain to obtain first frequency-domain data of the first audio signal, and converting the second audio signal from the time domain to the frequency domain to obtain second frequency-domain data of the second audio signal; and calculating to obtain the delay information between the first audio signal and the second audio signal according to a phase difference between the first frequency-domain data and the second frequency-domain data.

4. The audio play optimization method according to claim 2, wherein said determining the sound source position according to the first signal energy, the second signal energy, the delay information, and microphone positions, comprises:

determining a first position relationship between the first microphone position, the second microphone position, and the sound source position according to the first signal energy and the second signal energy;

determining a second position relationship between the first microphone position, the second microphone position, and the sound source position according to the delay information; and determining the sound source position according to the first position relationship and the second position relationship.

5. The audio play optimization method according to claim 4, wherein said determining a first position relationship between the first microphone position, the second microphone position, and the sound source position according to the first signal energy and the second signal energy, comprises:

calculating a propagation distance ratio of a sound signal according to a signal energy difference between the first signal energy and the second signal energy; and determining the first position relationship between the first microphone position, the second microphone position, and the sound source position according to the distance ratio.

6. The audio play optimization method according to claim 4, wherein said determining a second position relationship between the first microphone position, the second microphone position, and the sound source position according to the delay information, comprises:

calculating a distance difference of propagation of the sound signal according to the delay information; and determining the second position relationship between the first microphone position, the second microphone position, and the sound source position according to the distance difference.

7. The audio play optimization method according to claim 1, wherein the speaker array comprises a first speaker group and a second speaker group which are plane-symmetrical, and said determining a sound superimposition area of the speaker array, comprises:

acquiring a symmetry plane between the first speaker group and the second speaker group; and taking the symmetry plane as the sound superimposition area of the speaker array.

8. The audio play optimization method according to claim 1, wherein after said determining a sound source position according to the first position information and the audio signal, further comprising:

when there are determined more than one sound source position, rotating the speaker array by a preset angle, and returning to perform: acquiring the first position information of the microphone array and the audio signal output by the microphone array.

9. An electronic device, comprising:

at least one processor; and, a memory communicatively coupled to the at least one processor; wherein the memory stores instructions executable by the at least a processor, and the instructions, when executed by the at least a processor, are configured to execute an audio play optimization method according to claim 1.

10. A non-transitory computer-readable storage medium, wherein the readable storage medium stores a program implementing an audio play optimization method, and the program implementing the audio play optimization method, when executed by a processor, implements an audio play optimization method according to claim 1.

* * * * *